(12) United States Patent
Popp

(10) Patent No.: US 8,160,408 B2
(45) Date of Patent: Apr. 17, 2012

(54) MULTI-CHANNEL OPTICAL ROTARY COUPLING OF LOW REFLECTANCE

(75) Inventor: Gregor Popp, Munich (DE)

(73) Assignee: Schleifring und Apparatebau, Fuerstenfeldbruck (DE)

( * ) Notice: Subject to any disclaimer, the term of this patent is extended or adjusted under 35 U.S.C. 154(b) by 177 days.

(21) Appl. No.: 12/753,940

(22) Filed: Apr. 5, 2010

(65) Prior Publication Data

US 2010/0189394 A1 Jul. 29, 2010

Related U.S. Application Data

(62) Division of application No. 12/045,965, filed on Mar. 11, 2008, now Pat. No. 7,729,571.

(30) Foreign Application Priority Data

Mar. 12, 2007 (DE) .......................... 10 2007 012 224

(51) Int. Cl.
*G02B 6/26* (2006.01)
(52) U.S. Cl. ................. 385/26; 385/34; 385/31
(58) Field of Classification Search .............. 385/16–26, 385/34, 61, 64, 74, 79, 82, 93
See application file for complete search history.

(56) References Cited

U.S. PATENT DOCUMENTS

| 4,109,998 A | 8/1978 | Iverson |
| 4,325,584 A | 4/1982 | Christ et al. |
| 4,641,915 A | 2/1987 | Asakawa et al. |
| 4,725,116 A | 2/1988 | Spencer et al. |
| 4,858,292 A | 8/1989 | Buhlmann et al. |
| 4,872,737 A | 10/1989 | Fukahori et al. |
| 4,981,335 A | 1/1991 | Gaebe |
| 5,039,193 A | 8/1991 | Snow et al. |
| 5,073,040 A * | 12/1991 | Guinard .......................... 385/26 |
| 5,115,481 A | 5/1992 | Buhrer |
| 5,157,745 A | 10/1992 | Ames |
| 5,271,076 A | 12/1993 | Ames |
| 5,317,659 A | 5/1994 | Lee |
| 5,402,509 A | 3/1995 | Fukushima |
| 5,442,721 A | 8/1995 | Ames |
| 5,481,629 A | 1/1996 | Tabuchi |

(Continued)

FOREIGN PATENT DOCUMENTS

AT 410603 6/2003

(Continued)

OTHER PUBLICATIONS

Office Action mailed Oct. 18, 2010 for U.S. Appl. No. 11/962,333.

(Continued)

*Primary Examiner* — Ellen Kim
(74) *Attorney, Agent, or Firm* — Kevin L. Daffer; Daffer McDaniel, LLP

(57) ABSTRACT

An optical rotary joint comprises a first collimator arrangement for coupling-on first light-waveguides, and a second collimator arrangement for coupling-on second light waveguides, with the second collimator arrangement being supported to be rotatable relative to the first collimator arrangement about a rotation axis. At least one derotating optical element is provided in the light path between the first collimator arrangement and the second collimator arrangement. At least one collimator arrangement comprises a rod-shaped lens that is fastened on a support plate so that the axis of the lens is tilted at a given angle relative to the rotation axis of the rotary joint.

11 Claims, 4 Drawing Sheets

U.S. PATENT DOCUMENTS

| | | | |
|---|---|---|---|
| 5,568,578 | A | 10/1996 | Ames |
| 5,588,077 | A | 12/1996 | Woodside |
| 6,192,175 | B1 | 2/2001 | Li et al. |
| 6,236,787 | B1 | 5/2001 | Laughlin |
| 6,263,133 | B1 | 7/2001 | Hamm |
| 6,360,032 | B1 | 3/2002 | Berger et al. |
| 6,441,960 | B1 | 8/2002 | Wang et al. |
| 6,782,160 | B2 | 8/2004 | Townsend et al. |
| 6,823,142 | B1 | 11/2004 | Tanaka et al. |
| 6,862,383 | B2 * | 3/2005 | Kikuchi et al. .......... 385/33 |
| 7,076,131 | B2 | 7/2006 | Bolle |
| 7,142,747 | B2 | 11/2006 | Oosterhuis et al. |
| 7,239,776 | B2 | 7/2007 | Oosterhuis et al. |
| 7,246,949 | B2 | 7/2007 | Thiele et al. |
| 7,298,538 | B2 | 11/2007 | Guynn et al. |
| 7,343,068 | B2 * | 3/2008 | Shigenaga et al. .......... 385/33 |
| 7,352,929 | B2 | 4/2008 | Hagen et al. |
| 7,372,230 | B2 | 5/2008 | McKay |
| 7,373,041 | B2 | 5/2008 | Popp |
| 7,433,556 | B1 | 10/2008 | Popp |
| 7,734,130 | B2 | 6/2010 | Popp |
| 2002/0094163 | A1 | 7/2002 | Ooyama et al. |
| 2003/0099454 | A1 | 5/2003 | Chang |
| 2004/0017984 | A1 | 1/2004 | Thiele et al. |
| 2005/0036735 | A1 | 2/2005 | Oosterhuis et al. |
| 2005/0119529 | A1 | 6/2005 | Farr et al. |
| 2005/0141815 | A1 | 6/2005 | Pan et al. |
| 2006/0110092 | A1 | 5/2006 | Ikeda |
| 2007/0019908 | A1 | 1/2007 | O'Brien et al. |
| 2007/0053632 | A1 | 3/2007 | Popp |
| 2007/0237528 | A1 * | 10/2007 | Popp .......... 398/184 |
| 2008/0106711 | A1 | 5/2008 | Beierl et al. |
| 2008/0175535 | A1 | 7/2008 | Popp et al. |
| 2008/0226231 | A1 | 9/2008 | Popp |
| 2008/0317407 | A1 | 12/2008 | Popp |
| 2009/0303580 | A1 | 12/2009 | Popp et al. |
| 2010/0134803 | A1 | 6/2010 | Baier et al. |

FOREIGN PATENT DOCUMENTS

| | | |
|---|---|---|
| DE | 1300002 | 7/1969 |
| DE | 1575515 | 3/1970 |
| DE | 74062 | 6/1970 |
| DE | 1772492 | 2/1972 |
| DE | 3207469 | 9/1982 |
| DE | 19809823 | 9/1999 |
| DE | 20105786 | 7/2001 |
| DE | 69704783 | 11/2001 |
| DE | 10029206 | 1/2002 |
| DE | 102004026498 | 12/2005 |
| DE | 60019966 | 2/2006 |
| DE | 102006022023 | 11/2006 |
| DE | 102005056899 | 5/2007 |
| EP | 0490054 | 6/1992 |
| EP | 0588039 | 3/1994 |
| EP | 1345051 | 9/2003 |
| EP | 1359452 | 11/2003 |
| EP | 1476969 | 1/2005 |
| GB | 2005044 | 4/1979 |
| JP | 63208821 | 8/1988 |
| JP | 2113213 | 4/1990 |
| JP | 2141708 | 5/1990 |
| WO | 01/98801 | 12/2001 |
| WO | 03/069392 | 8/2003 |

OTHER PUBLICATIONS

Hecht, Optik, © 1974 Addison-Wesley Publishing, 8 pages.
Schleifring, "Mikrooptischer Dreguebertrager," 2005, 12 pages.
U.S. Appl. No. 11/962,333, filed Dec. 21, 2007.
Office Action mailed Apr. 3, 2009 for U.S. Appl. No. 12/144,106.
Office Action mailed Aug. 26, 2009 for U.S. Appl. No. 12/144,106.
Office Action mailed Feb. 1, 2010 for U.S. Appl. No. 12/144,106.
.Office Action mailed Apr. 5, 2007 for U.S. Appl. No. 11/469,004.
Notice of Allowance mailed Oct. 10, 2007 for U.S. Appl. No. 11/469,004.
Notice of Allowance mailed Jan. 7, 2008 for U.S. Appl. No. 11/469,004.
Office Action mailed Feb. 22, 2008 for U.S. Appl. No. 11/766,361.
Notice of Allowance mailed Jul. 14, 2008 for U.S. Appl. No. 11/766,361.
Office Action mailed Oct. 30, 2009 for U.S. Appl. No. 11/563,371.
Notice of Allowance mailed Jan. 26, 2010 for U.S. Appl. No. 11/563,371.
Office Action mailed Jan. 18, 2012 for U.S. Appl. No. 12/478,556.

* cited by examiner

MULTI-CHANNEL OPTICAL ROTARY COUPLING OF LOW REFLECTANCE

PRIORITY CLAIM

The present application is a divisional from prior U.S. patent application Ser. No. 12/045,965 filed Mar. 11, 2008 which claims priority to German Patent Application No. 102007012224.3 filed Mar. 12, 2007.

BACKGROUND OF THE INVENTION

1. Field of the Invention

The invention relates to a device for transmitting optical signals between units that are rotatable relative to each other. Devices of this kind are also referred to as being rotary couplings or rotary joints. It is intended that a plurality of signals be transmitted simultaneously along a plurality of channels.

2. Description of the Related Art

Various transmission systems are known for transmitting optical signals between units that are rotatable relative to each other.

An optical rotary joint for a plurality of channels, having a Dove prism, is disclosed in U.S. Pat. No. 5,568,578. An arrangement with a plurality of GRIN lenses is provided for coupling light into or out of glass fibers. In this, the individual GRIN lenses are fixed onto a support to be parallel to the axis of the rotary joint. The ends of the glass fibers are retained in ferrules and are adhesively joined to the GRIN lenses via these ferrules. For exact adjustment, the individual ferrules can be moved together with the fiber ends retained therein across the plane face of the surface ground GRIN lenses.

Another kind of optical rotary joint is disclosed in WO 01/98801. This describes a micro-optical system which comprises optical and mechanical components as a one-piece part. This design permits attainment of a substantially higher packing density of the individual glass fibers. Furthermore, a laborious adjustment of individual glass fibers or ferrules relative to the lenses becomes unnecessary, because the geometry of the support is already predetermined by the monolithic fabrication process of the micro-optical system.

A disadvantage of the known prior art is that relatively strong reflections of the transmitted light occur inside the rotary joint.

BRIEF SUMMARY OF THE INVENTION

The invention is based on the object of improving a rotary joint for multi-channel transmission of optical signals. In particular, the optical reflections inside the rotary joint, as occur in prior art, are to be reduced.

In accordance with the invention, this object is achieved with an optical rotary joint that comprises: at least one first collimator arrangement for coupling-on first light waveguides; a second collimator arrangement for coupling-on second light waveguides, supported to be rotatable relative to the first collimator arrangement about a rotation axis; at least one derotating optical element located in a light path extending between the first collimator arrangement and the second collimator arrangement; with at least one collimator arrangement comprising at least one support plate on which at least one rod-shaped lens for coupling-on at least one of the light-waveguides is fastened; with a direction of emergence of a light beam from the at least one rod-shaped lens being parallel to the rotation axis; and wherein an axis of the at least one rod-shaped lens extends at a given angle to the rotation axis.

BRIEF DESCRIPTION OF THE DRAWINGS

In the following the invention will be described by way of example, without limitation of the general inventive concept, on examples of embodiment and with reference to the drawings.

DETAILED DESCRIPTION OF PREFERRED EMBODIMENTS

Figure 1:
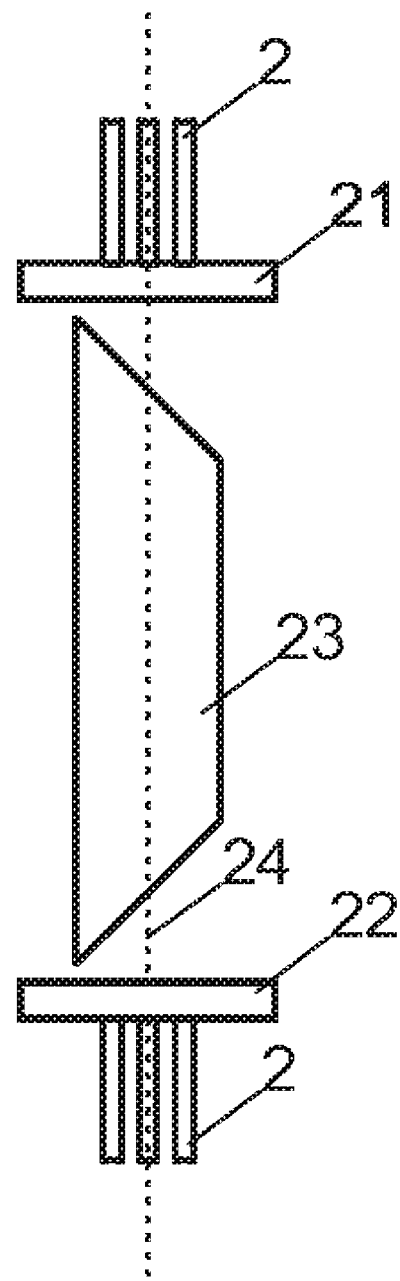
FIG. 1 schematically shows in a general form an arrangement in accordance with the invention.

FIG. 1 schematically shows a sectional view of an arrangement in accordance with the invention. The optical rotary joint in accordance with the invention comprises a first collimator arrangement 21 for coupling-on light-waveguides 2, and a second collimator arrangement 22 for coupling-on further light-waveguides 2. The second collimator arrangement 22 is supported to be rotatable relative to the first collimator arrangement 21 about a rotation axis 24. A derotating element 23 is located in a beam path between the first collimator arrangement 21 and the second collimator arrangement 22 to compensate the rotary movement. This derotating element is here shown to be a Dove prism, by way of example.

Figure 2:
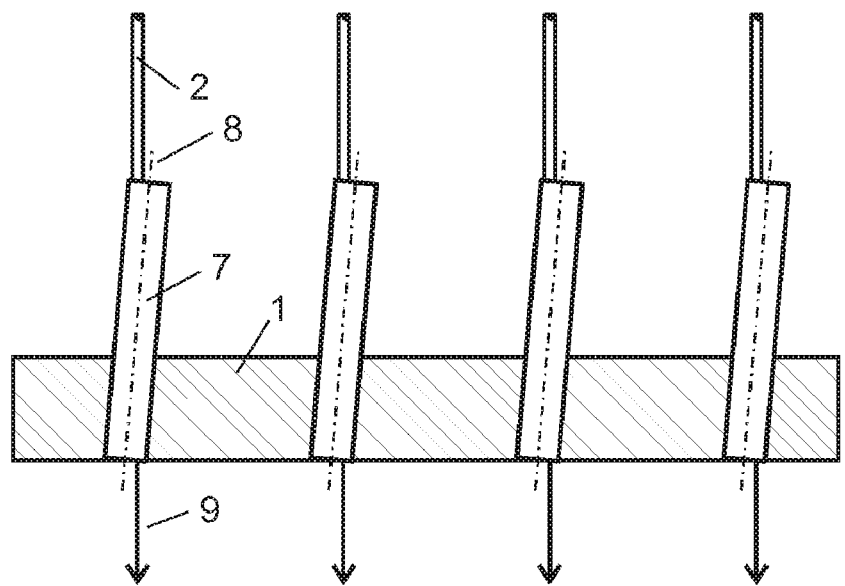
FIG. 2 shows an example of embodiment of a collimator arrangement in accordance with the invention.

FIG. 2 shows an example of an embodiment of a collimator arrangement in accordance with the invention. A support plate 1 serves to accommodate collimators 7. For this, the support plate comprises suitable bores. Here the collimators are designed as rod-shaped (cylinder-shaped) lenses, for example as GRIN lenses. A light-waveguide 2 is attached to one end of each of the lenses. Light guided by the light-waveguide emerges from the collimator in a direction 9. This direction, and with it also the directional arrow, is parallel to the rotation axis of the rotary joint. The derotating optical element is located along this direction. Similarly, light from the derotating optical element can be transmitted also in an opposite direction in the collimator and coupled via this into a light-waveguide 2. In accordance with the invention, the axes 8 of the collimators 7 are tilted with respect to the rotation axis of the rotary joint, and therewith also to the emerging direction 9. Now, in order to achieve in the example of GRIN lenses a beam emergence direction which is parallel to the rotation axis of the rotary joint, the light-waveguides 2 are attached to be laterally displaced with respect to the axis 8 of the collimators 7. By way of example, the light-waveguides 2 are here joined to the collimators whilst being parallel to the rotation axis.

Figure 3:
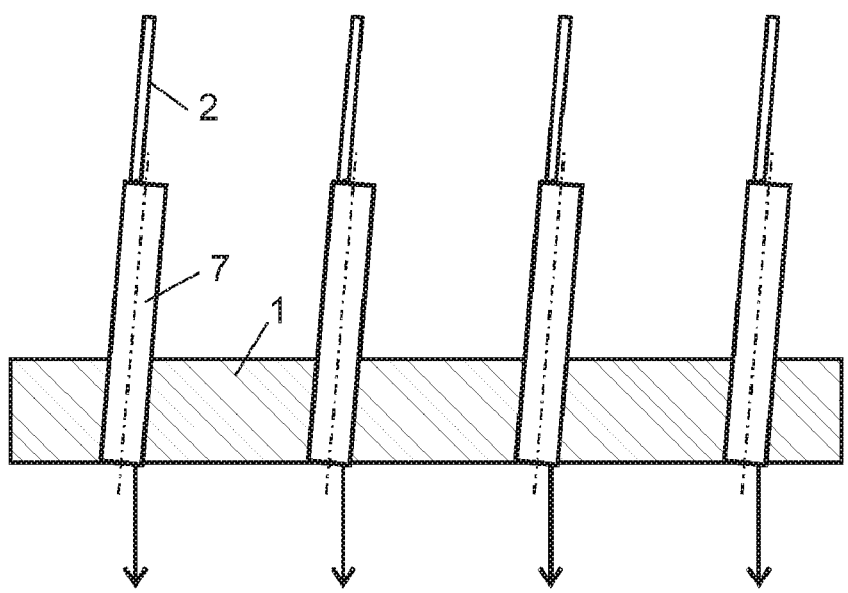
FIG. 3 shows another embodiment of a collimator arrangement in accordance with the invention.

FIG. 3 illustrates another embodiment of the collimator arrangement in accordance with the invention. This is basically similar to the collimator arrangement of FIG. 2. However, here the light-waveguides 2 are attached to be perpendicular to the surface of the collimators 7, and thus parallel to the axis 8 of the collimators. This makes possible a simplified mounting of the light-waveguides to the collimators before these are inserted into the support plate 1.

Figure 4:
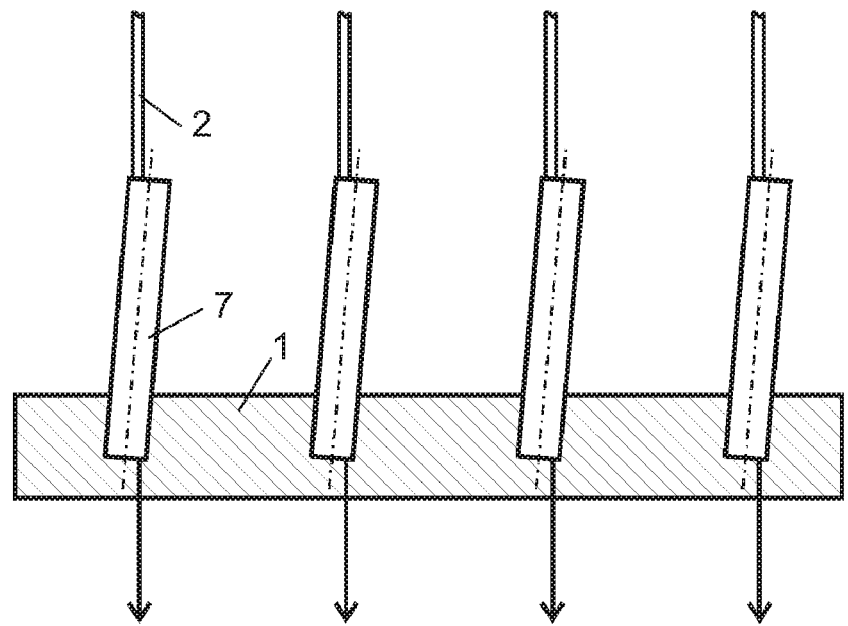
FIG. 4 shows another embodiment in which the collimators are accommodated in blind-end bores of a support plate of an optically transparent material.

FIG. 4 illustrates another embodiment of the invention. As distinct from the collimator arrangement of FIG. 2, the collimators 7 are now accommodated in blind-end bores of the support plate 1. Here the support plate 1 comprises an optically transparent material, so that the light can pass through the plate in the direction of the derotating optical element with low attenuation.

Figure 5:
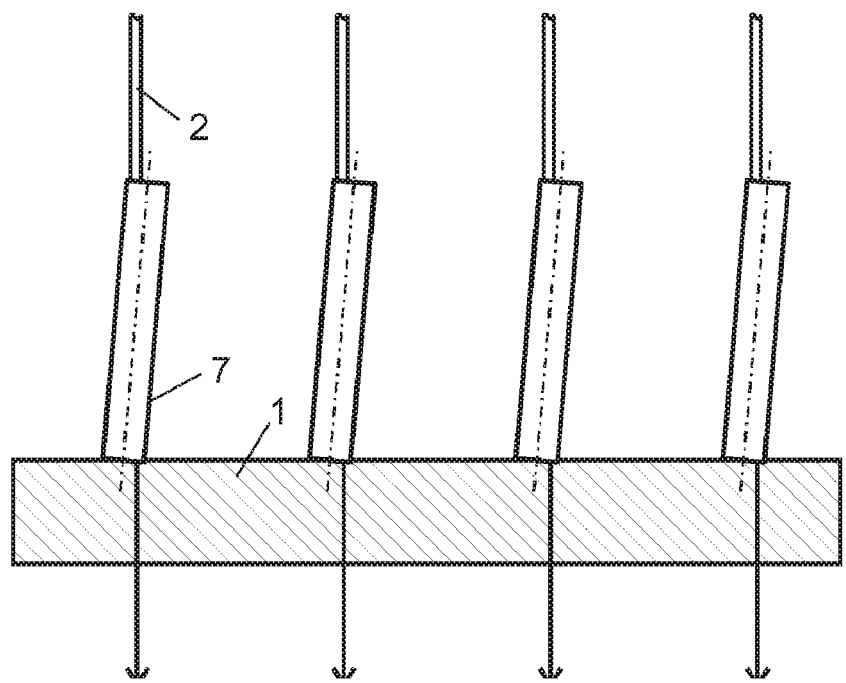
FIG. 5 shows an embodiment of the invention, in which the collimators are fastened on the surface of a support plate of an optically transparent material.

FIG. 5 shows another embodiment of the invention, in which the collimators 7 are fastened on the surface of a support plate. The support plate comprises at least regions of an optically transparent material. Preferably these completely consist of an optically transparent material.

Figure 6:
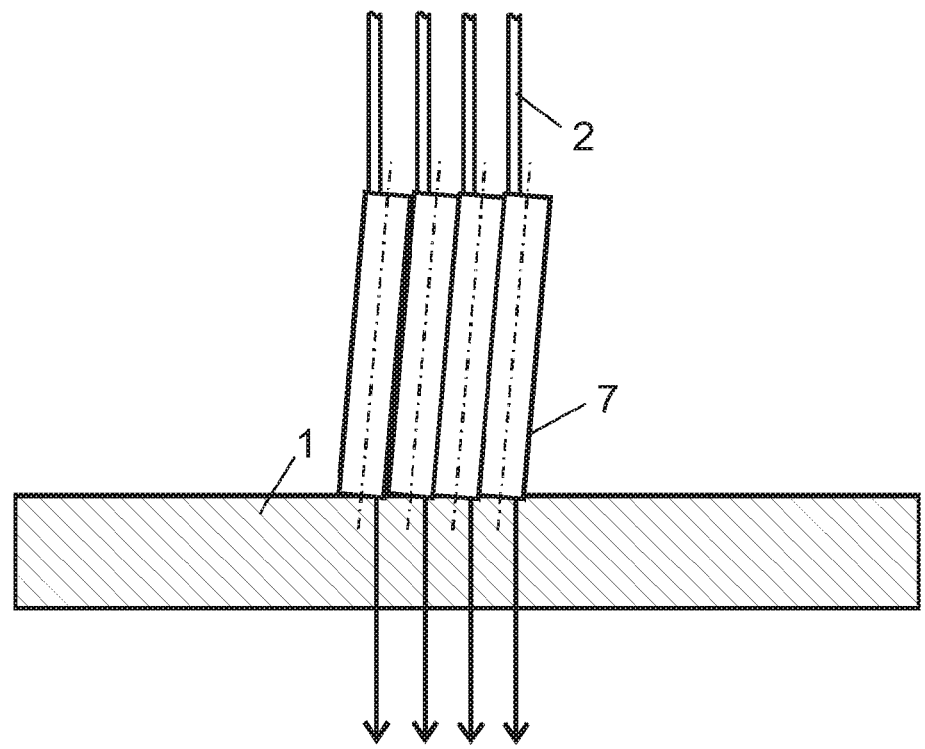
FIG. 6 shows another embodiment of the invention, in which a plurality of collimators are joined to each other to form a bundle.

FIG. 6 shows another embodiment in which a plurality of collimators 7 gathered together in the form of a bundle are arranged on the surface of an optically transparent plate 1.

Figure 7:
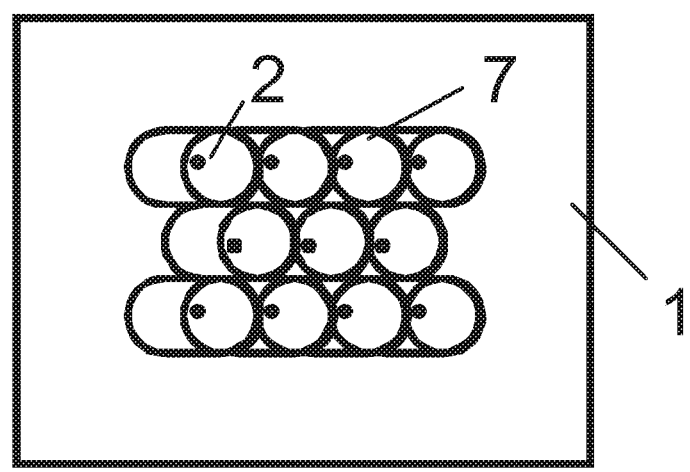
FIG. 7 shows a plan view of the collimator arrangement of FIG. 6.

FIG. 7 shows an enlarged plan view of the collimator arrangement of FIG. 6.

The device in accordance with the invention comprises two collimator arrangements 21, 22 which are disposed to be rotatable relative to each other about a rotation axis. Between the first collimator arrangement 21 and the second collimator arrangement 22 disposed to be rotatable relative thereto is an optical path for transmission of light. Located in this optical path is at least one derotating optical element 23 which acts to enable an imaging of light emitted by the first collimator arrangement 21 onto the second collimator arrangement 22, and also acts similarly in the opposite direction, independently from the rotational movement between the two collimators. A derotating element 23 of this kind can be a Dove prism, for example. Of course, other derotating elements such as an Abbe-König prism, or a fiber bundle, can also be used.

Each of the collimator arrangements 21, 22 comprises at least one collimator and also at least one means for retaining the at least one collimator. The term collimator is used here in its broadest sense for a beam-guiding or beam-shaping element. The purpose of a collimator of this kind consists of converting the light guided in a light-waveguide, for example a single-mode fiber, or also a multi-mode fiber, to a beam path that can be passed through the rotary joint, and particularly through the derotating element. This corresponds to a beam path in free space, or in an optical medium such as glass or oil, for example. Similarly, a conversion in the opposite direction, i.e. from the beam path in the rotary joint to a light-wave guide, can be effected with a collimator. Of course, conversions in both directions within a collimator are also conceivable. Typically, the collimators are lenses, with gradient-index lenses (GRIN lenses) being especially preferred.

In accordance with the invention, at least one of the collimator arrangements 21, 22 comprises at least one collimator that is tilted through a given angle with respect to the rotation axis 24. The tilting refers to the optical axis of the collimator. This frequently coincides with the longitudinal axis of the collimator. This means that the collimator is not aligned to be parallel to the rotation axis.

In prior art an alignment parallel to the rotation axis is essential to the functioning of the arrangement. Thus, all optical components are aligned to be parallel to the rotation axis in order to achieve high parallelism of the directions of the light beams 9 and the rotation axis 24. A low transmission loss that is independent of the angle of rotation can be achieved between the first collimator arrangement 21 and the second collimator arrangement 22 only with high parallelism of the light beams. Then however, even with typically used rod-shaped collimator lenses, the end faces of the lenses between the first collimator arrangement 21 and the second collimator arrangement 22 will be aligned to be parallel to each other, because the end faces typically extend perpendicularly to the axis of the collimator lenses (collimators). Reflections at these faces are then mirrored back with high accuracy into the opposite collimator. This leads to relatively strong reflections of a fed-in optical signal. If the rod-shaped collimator lenses according to the invention are mounted in the collimator arrangements, then the lenses will be disposed at an angle to the rotation axis. Accordingly, the end faces of the collimator lenses also will be disposed at an angle to the perpendicular to the rotation axis. With this, light reflected at the end face is no longer reflected back into the opposite collimator. Thereby the reflections in the arrangement are reduced. The angle of tilt is typically within a range of a few degrees. It is preferred to be within a range of 1°-15°, and especially preferred to be within a range of 5°-10°.

Now, in order to achieve that with an arrangement according to the invention the light will emerge from a rod-shaped lens, mounted in accordance with the invention at an angle to the rotation axis, to be exactly parallel to the rotation axis, a light waveguide 2 must be connected to an end of the lens at a location outside the optical axis of the rod-shaped lens. The exact location is chosen so that an emergence of light parallel to the rotation axis results.

As an alternative to the invention as described above, it is also possible to dispose the lenses parallel to the rotation axis, and to design the end faces to be oblique, so that they no longer extend perpendicularly to the rotation axis, but at an angle to the rotation axis. This angle is typically within the range of a few degrees. It is preferred to be within a range of 0.1°-15°, and especially preferred to be within a range of 0.5°-10°.

In another advantageous embodiment of the invention, at least one support plate 1 for accommodating at least one rod-shaped lens is provided with at least one bore. The at least one rod-shaped lens can now be inserted into the at least one bore and advantageously fixed therein with an adhesive. It is of especial advantage for the at least one bore to be designed with narrow tolerance, so that the at least one lens within the at least one bore need no longer be adjusted. In case optical tolerances of the lenses need to be compensated, the at least one bore also can be made larger than the at least one lens, so that the at least one lens can be adjusted within the bore and then fixed.

In another embodiment of the invention, the at least one support plate 1 for accommodating at least one rod-shaped lens comprises at least one blind-end bore. The at least one lens can now be retained in this at least one blind-end bore. Because the light of the at least one optical beam path passes through the at least one support plate, the at least one support plate consists of an optically transparent material, or comprises regions of an optically transparent material in the beam path.

Similarly, the lenses can be fastened, and preferably adhered, to a support plate 1 of an optically transparent material. Owing to the fastening or adhering of the lenses, these are fixed in exactly defined positions. The adjustment can be effected, for example, with an automatic positioning machine or also with mechanical devices.

In an especially advantageous embodiment of the invention, a plurality of rod-shaped lenses 7 are arranged in a bundle and adhered to each other. Again, they then can be fastened to a support plate, preferably of an optically transparent material. Instead of positioning the individual lenses of the bundle to be inclined, it is also possible to dispose the lenses to be parallel to the rotation axis, and to design the end faces to be inclined, so that they no longer extend perpendicularly to the rotation axis, but at an angle to the rotation axis. This angle is typically within a range of a few degrees. It is preferred to be within a range of 0.1°-15°, and especially preferred to be within a range of 0.5°-2°. An angle of about 0.9° has been found to be of special advantage.

With the embodiment in accordance with the invention it is now possible to incorporate a multitude of lenses for light-waveguides within a single unit at low outlay. Thus, in an ideal case an optical rotary joint still comprises only one single first collimator and one single second collimator, with each collimator comprising a support plate with adhering lenses. Because during their manufacture the lenses can be fastened on the support plate with already exactly defined minimal tolerances, only an adjustment of the support plate together with the lenses as a unit is necessary during final assembly. Similarly or alternatively, the individual light-waveguides, preferably in ferrules, also can be fastened onto the support plate in a state of being adjusted. With this, an adjustment of a multiplicity of individual lenses or light-waveguides during final assembly becomes unnecessary. The arrangement on a support plate results in a highly robust and space-saving embodiment.

It is of special advantage when at least one light-waveguide 2 is connected to an end face of at least one rod-shaped lens 7 in a manner so that the axis of the at least one light-waveguide is disposed at an angle to the axis of the at least one rod-shaped lens. This angle is typically within a range of a few degrees. It is preferred to be within a range of 1°-20°, and especially preferred to be within a range of 5°-10°. Experiments have shown that for a coupling-on of multi-mode fibers, angles of about 12°, and for a coupling-on of single mode fibers, angles of about 8° are of special advantage.

The invention claimed is:

1. An optical rotary joint, comprising:
    at least one first collimator arrangement;
    a second collimator arrangement supported to be rotatable relative to the first collimator arrangement about a rotation axis; and
    a derotating optical element located in a light path extending between the first collimator arrangement and the second collimator arrangement;
    wherein at least one of the first and second collimator arrangements comprises:
        a rod-shaped lens comprising at least a portion arranged at an oblique angle relative to the rotation axis; and
        a light waveguide connected to an end face of the rod-shaped lens and laterally displaced with respect to an optical axis of the rod-shaped lens.

2. The optical rotary joint of claim 1, wherein the light waveguide is arranged at an oblique angle with respect to the optical axis.

3. The optical rotary joint of claim 2, wherein the least one light waveguide is arranged at an angle between approximately 1° and approximately 20° with respect to the optical axis.

4. The optical rotary joint of claim 1, wherein the light waveguide is arranged parallel to the optical axis.

5. The optical rotary joint of claim 1, wherein the entirety of the rod-shaped lens is arranged at the oblique angle relative to the rotation axis.

6. The optical rotary joint of claim 1, wherein an end portion of the rod-shaped lens facing the derotating optical element is arranged at the oblique angle relative to the rotation axis, and wherein a remainder portion of the rod-shaped lens is arranged parallel to the rotation axis.

7. The optical rotary joint of claim 1, wherein the at least one collimator arrangement further comprises a support plate with bores in which at least a portion of the rod-shaped lens is fastened.

8. The optical rotary joint of claim 1, wherein the least one collimator arrangement further comprises a support plate comprising an optically transparent material, and wherein the rod-shaped lens is fastened to a surface of the support plate.

9. The optical rotary joint of claim 8, wherein the support plate consists essentially of the optically transparent material.

10. The optical rotary joint of claim 1, wherein the rod-shaped lens is one of a plurality of rod-shaped lenses comprising the at least one collimator arrangement.

11. The optical rotary joint of claim 1, wherein the first collimator arrangement is rotatable relative to the second collimator arrangement.

* * * * *